(12) United States Patent
Tadano et al.

(10) Patent No.: US 6,571,664 B2
(45) Date of Patent: Jun. 3, 2003

(54) LINK ROD

(75) Inventors: Hideo Tadano, Osaka (JP); Hiroaki Takahashi, Osaka (JP); Akihiko Kato, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/915,162

(22) Filed: Jul. 25, 2001

(65) Prior Publication Data

US 2002/0189394 A1 Dec. 19, 2002

(30) Foreign Application Priority Data

Dec. 13, 2000 (JP) .......................... 2000-379409

(51) Int. Cl.⁷ .......................... G05G 3/00; B62D 21/12
(52) U.S. Cl. .................. 74/588; 74/579 R; 280/785; 280/124.1; 403/114
(58) Field of Search ................ 74/579 R, 588; 280/124.1, 799, 788; 180/905; 403/114

(56) References Cited

U.S. PATENT DOCUMENTS

| | | | |
|---|---|---|---|
| 2,215,967 A | | 9/1940 | Leighton |
| 2,242,021 A | * | 5/1941 | Ball .......................... 74/588 |
| 4,830,396 A | * | 5/1989 | Gandiglio .................. 280/701 |
| 5,165,306 A | * | 11/1992 | Hellon |
| 5,308,115 A | * | 5/1994 | Ruehl et al. ............... 280/785 |
| 5,605,353 A | * | 2/1997 | Moss et al. ................ 280/784 |
| 5,823,065 A | * | 10/1998 | Egner-Walter .............. 74/519 |
| 5,992,867 A | * | 11/1999 | Kato et al. ............ 280/124.134 |
| 6,109,653 A | * | 8/2000 | Maruyama et al. ......... 280/781 |
| 6,120,060 A | * | 9/2000 | Kocer et al. ............... 280/788 |
| 6,394,473 B1 | * | 5/2002 | Platner .................... 280/124.1 |

FOREIGN PATENT DOCUMENTS

| | | | | |
|---|---|---|---|---|
| EP | 0678441 A1 | * | 10/1995 | .............. 280/124.1 |
| EP | 0887246 | | 12/1998 | |
| FR | 2725393 | * | 4/1996 | .............. 280/124.1 |
| JP | 6-263060 | * | 9/1994 | .............. 280/124.1 |
| JP | 9-95263 | * | 4/1997 | .............. 280/124.1 |
| JP | 11-129937 | * | 5/1999 | .............. 280/124.1 |
| JP | 2000-72029 | * | 3/2000 | .............. 280/124.1 |
| JP | 2000-229581 | * | 8/2000 | .............. 280/124.1 |

* cited by examiner

Primary Examiner—Vinh T. Luong
(74) Attorney, Agent, or Firm—Jordan and Hamburg LLP

(57) ABSTRACT

A link rod for supportably suspending a structural member from a vehicle frame includes a one-piece body press-formed from a metal plate material. The one-piece body defines a main rod section having a bent portion at one end thereof forming a first attachment section which lies on a plane arranged crosswise to a plate plane of the main rod section, and a second attachment section attachment section extending contiguously to an opposite end of the main rod section co-directionally with the plate plane. Reinforcing flanges formed at lateral edges of the main rod section. The reinforcing flanges include extension edges disposed at the bend portion and extending at least from the one end of the main rod toward the first attachment section, the extension edges being bent outwardly from top edge portions of the reinforcing flanges in a direction crosswise to a remainder thereof.

10 Claims, 7 Drawing Sheets

LINK ROD

BACKGROUND OF THE INVENTION

This invention relates to a link rod linking a body frame of an automobile and a member suspended therefrom.

In an automobile construction supporting a member for holding and bearing thereon an engine, transmission and related components, it is a well-known practice to connect the member at a front side thereof to a body frame through a link rod thus supporting the member in a suspended manner. The link rod is attached at the one end to the body frame through a rubber bush and at another end to the member through the rubber bush.

As exemplified in the accompanying FIGS. 12 to 15, a conventional link rod 101 of this kind is made of a metal pipe material and is constructed of a main rod section 102 which is fashioned by flattening working into a flattened shape generally of an ellipsoid in cross-section and of both terminal parts each flattened more so as to form a double superposed plate, in which the one terminal part is formed by being bent squarely to the elongate direction of the rod into a first attachment section 110 having an attachment hole 111 for fitting a bush at its center. The other terminal part is formed as a second attachment section 120 having an attachment hole 121 for fitting the bush, the second attachment section having an axial center in a direction intersecting an axial center of the first attachment section at an eccentric position. These attachment sections are mounted respectively to either of the body frame and the member, for instance, the first attachment section 110 is mounted to the body frame and the second attachment section 120 to the member.

In such case where the link rod is installed to the body frame and the member through the rubber bush as stated above, however, the link rod itself can cause a resonance vibration to the vibration of the member, which leads to a vibration or vibratory movement of the vehicle and generation of noise.

As a consequence, it is necessary to preliminarily set a mass, spring rate, and natural frequency value of the link rod while retaining a predetermined strength so that satisfactory vibration insulation characteristics can be obtained. Yet with the existing link rod made of a pipe material, the fabrication and working associated therewith are not easily accomplished and involve a high cost. Moreover, there is no design freedom, and as such, it is difficult to alter, control, etc. the mass and spring rate, and additionally, it is not easy to set the inherent value.

SUMMARY OF THE INVENTION

In view of the prior art problems above, it is the object of the invention to provide a link rod for connecting a body frame of an automobile and a member suspended therefrom, which is permits facilitated fabrication and allows the strength and mass to be readily adjusted, and further to optionally set the natural frequency value.

Briefly stated, the invention relates to a link rod comprising a main rod section extending vertically in the form of a plate of a required width; a first attachment section extending to form a bend portion by bending from one end of the main rod section toward the extending direction of the rod and having an attachment hole with a vertical axis center defined in the nearly central part thereof, and a second attachment section extending-contiguously to the other end of the main rod section and having an attachment hole with an axis center in a direction intersecting an axis center of the first attachment section. The invention is characterized in that the link rod is press formed of a metal plate material in a one-piece body; and the main rod section is formed, at both side edges thereof, with reinforcing flanges, the reinforcing flanges being configured in a bend form to extend contiguously at least to the location of the bend portion at the proximal end of the first attachment section. Here, it is preferred that the reinforcing flanges be configured in a bend form on the side of the first attachment section so as to extend contiguously to and alongside of the first attachment section.

According to the link rod above, it is possible to fabricate same by press forming in contrast to the case of working from a pipe material. Additionally, the reinforcing flanges, which the main rod section has at both lateral edges thereof, permit to the link rod to maintain a sufficient strength notwithstanding the plate material. More particularly, because the flanges are formed to extend contiguously from the main rod section at least to the end of the bend portion at the first attachment section, the retention of the strength at the bend portion is secured, thus permitting the link rod to maintain a predetermined spring rate. In particular, where the flanges are formed to extend contiguously to the first attachment section, it is possible to further reinforce the first attachment section together with the bend portion.

Further, owing to the press-forming working from a plate material, boring work or alteration in thickness of the plate and height of the flanges is facilitated; the strength and mass are easily adjustable; and it is possible to determine easily the spring rate by a model analysis, so that setting of the natural frequency value is also facilitated.

In the aforementioned link rod, where the reinforcing flanges have, at the bend portion from the main rod section toward the first attachment section, extension edges bent outwardly, it is possible to reinforce more effectively the bend portion, on which stress is most liable to concentrate.

In addition, in a preferred embodiment of the aforementioned link rod in which the attachment holes of the first and the second attachment sections are formed at their peripheral edges with cylindrical projections, the rubber bush can be fitted and fastened most stably, rendering the mounting state stable. Additionally, the cylindrical projections serve to strengthen the attachment sections of the plate form.

The above, and other objects, features and advantages of the present invention will become apparent from the following description read in conjunction with the accompanying drawings.

DETAILED DESCRIPTION OF THE PREFERRED EMBODIMENT

Figure 1:
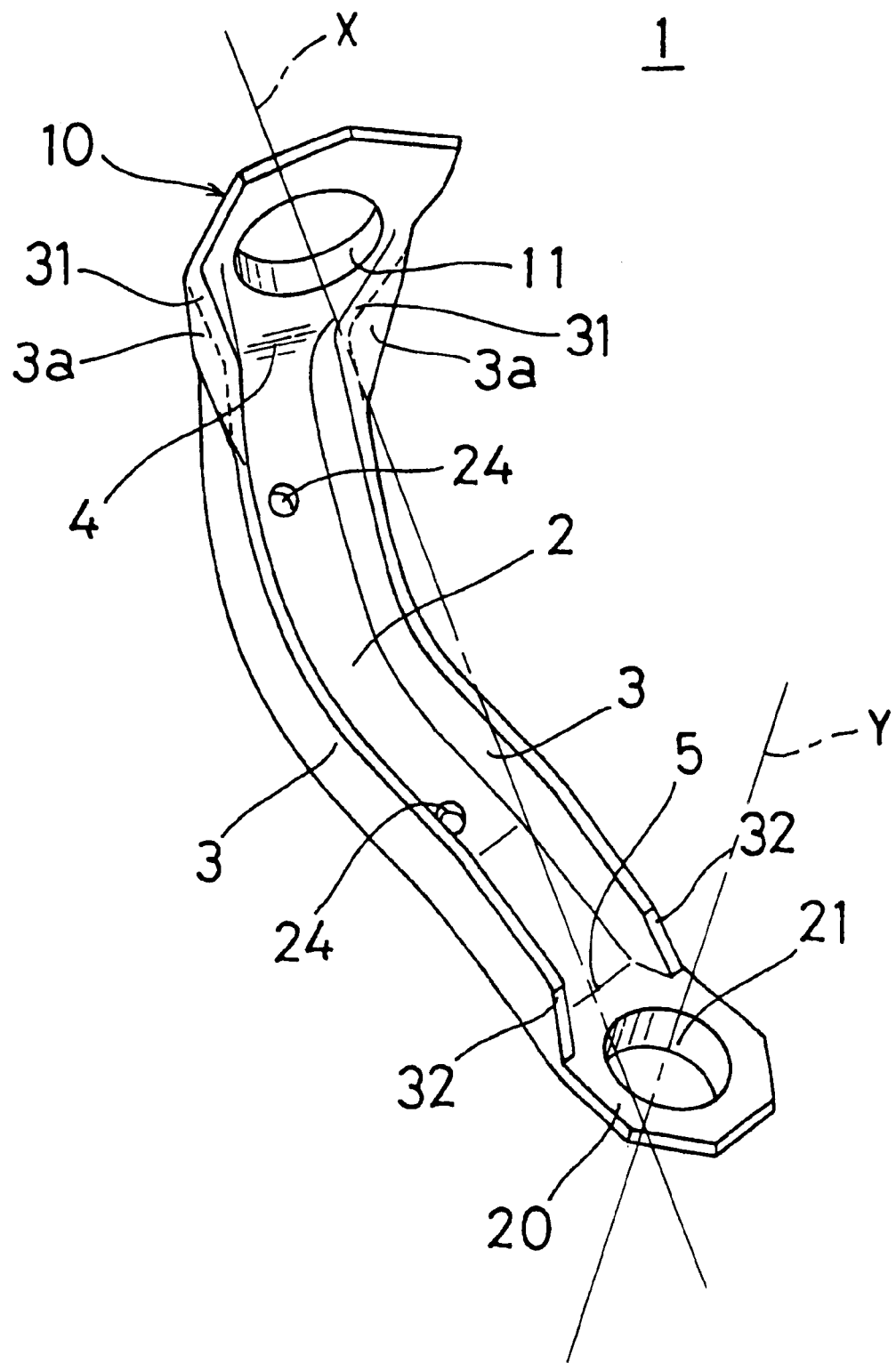
FIG. 1 is a perspective view showing a first example of a link rod pertaining to this invention.
Figure 2:
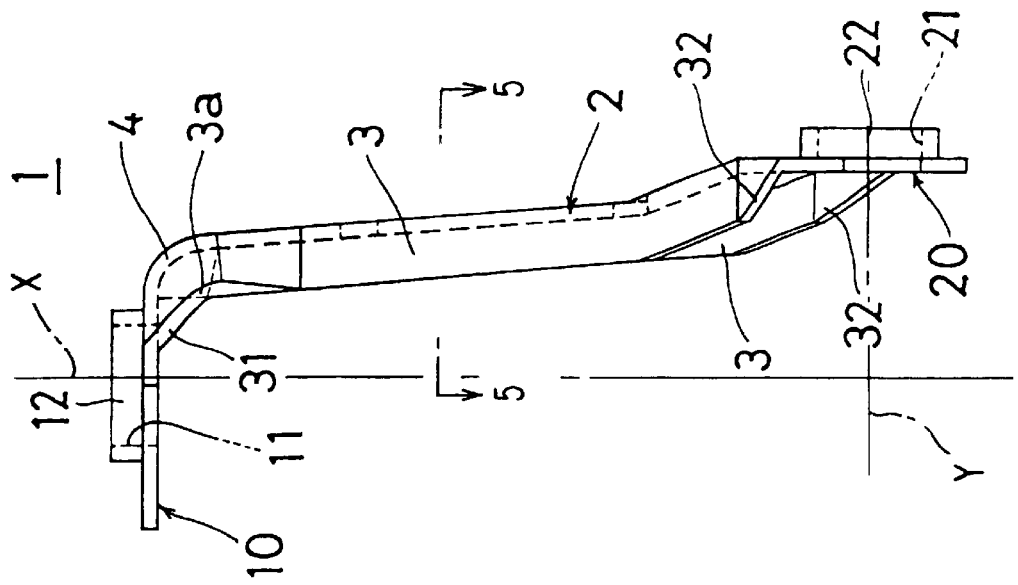
FIG. 2 is a side elevational view of the link rod in FIG. 1.
Figure 3:
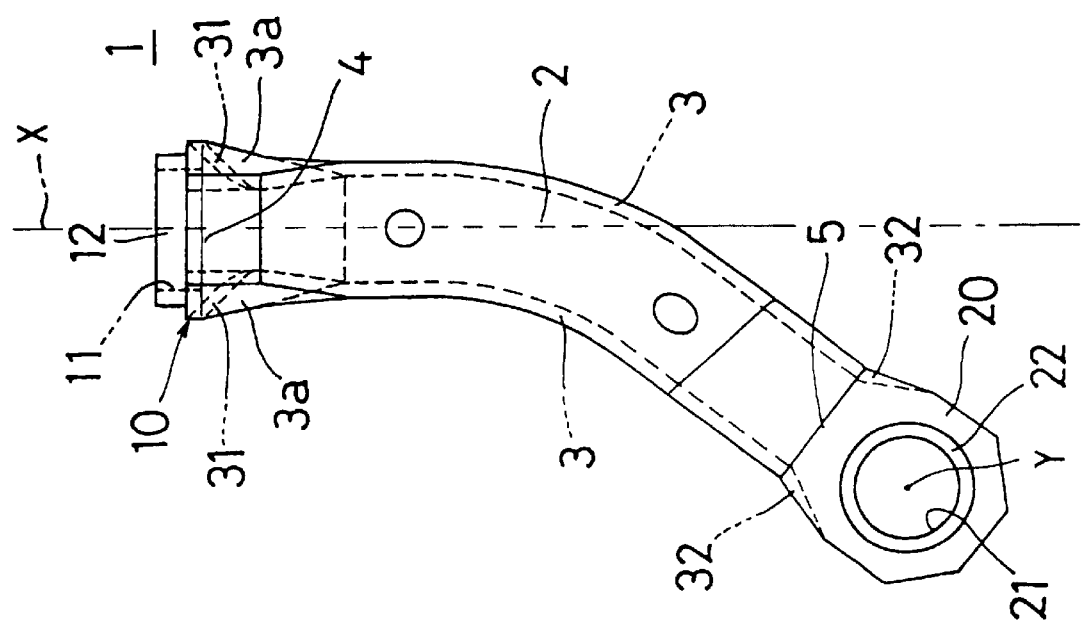
FIG. 3 is a front elevational view of the link rod in FIG. 1.
Figure 4:
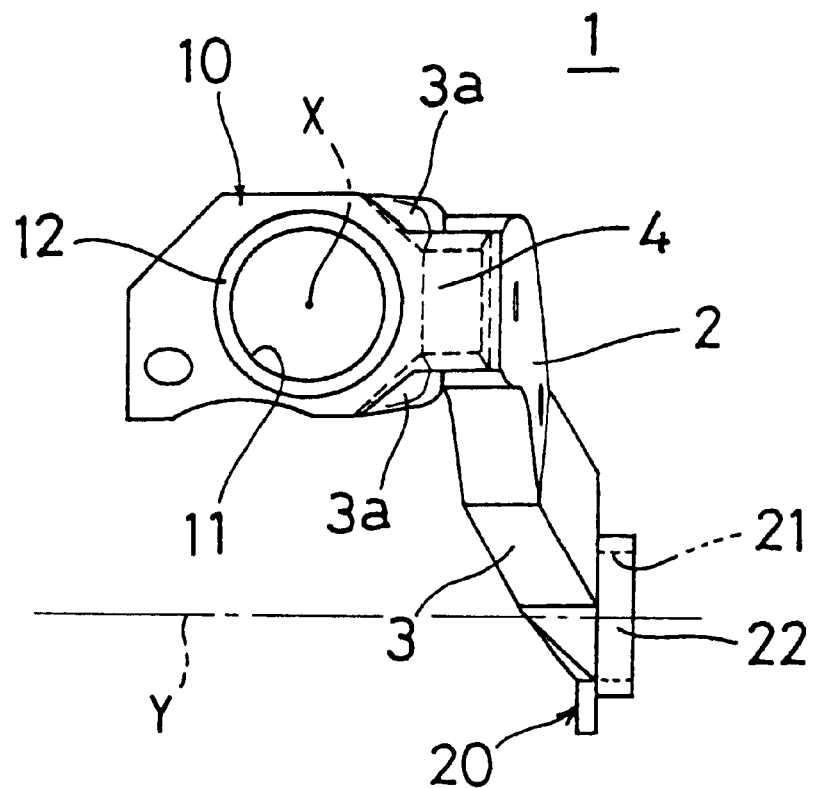
FIG. 4 is a plan view of the link rod FIG. 1.
Figure 5:
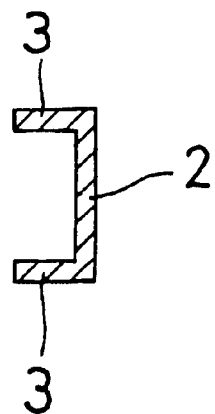
FIG. 5 is a cross-sectional view of FIG. 2 taken along the 5—5 line.

Embodiments of the invention will be hereinafter described with reference to examples illustrated in the drawings.

FIGS. 1 to 5 indicate a first example of a link rod according to this invention. In these figures, the reference numeral 1 designates a link rod of this invention, which is configured as a one-piece body by press forming out of a metal plate material.

The link rod 1 is comprised of a main rod section 2 extending vertically in the form of a plate of a required width and a required length, a first attachment section 10 joined contiguously to the one end part of the main rod section 2 and a second attachment section 20 joined contiguously to the other end part. The first attachment section 10 is, for example, constructed to extend in a manner being bent from the upper part of the main rod section 2 toward a nearly square direction with the plate plane relative to the extending direction of the rod so as to form a radius as required and is defined, in the nearly middle of its extending part, with an attachment hole 11 with a vertical axis center X for fitting a bush. The second attachment section 20 is constructed to extend in the nearly same direction as the extending direction of the main rod section 2 and is defined with an attachment hole 21 for fitting of the bush having an attachment hole axis center Y in a direction intersecting with the vertical axis center X of the first attachment section 10 at an eccentric position. The first attachment section 10 and the second attachment section 20 are adapted to be mounted respectively to either of the body frame and the member through a rubber bush (not shown).

Usually, the first attachment section 10 is mounted to the body frame side, with its center directed in the vertical direction, namely the plate plane being horizontal. Conversely, the first attachment section 10 can be mounted upside down to the member side.

In this first example, the main rod section 2 is configured to be bent, at a middle position thereof relative to the frontward and rearward directions considering a mounting space inside the vehicle, and further to extend toward the second attachment section 20, forming a slight fold relative to the plate plane on the side of the second attachment section 20, and besides, the plate plane of the second attachment section 20 makes a nearly parallel direction with the axis center of the first attachment section 10.

In addition, the main rod section 2 is provided, at both widthwise side edges thereof, with reinforcing flanges 3,3 which are formed to be bent nearly squarely on the same side as the side at which the first attachment section 10 is bent, thus assuming a U-form in cross-section, and the flanges 3,3 are formed, on the side of the first attachment section 10, to extend up to the proximal end of the first attachment section at a bend portion 4 continuing from the main rod section 2 toward the first attachment section 10, namely, up to the radius end so that the bend portion 4 can be reinforced. In the figures, terminal portions 31, 31 of the flanges 3,3 are formed contiguously to be inclined up to the first attachment section 10 so that further better reinforcing action can be performed.

Furthermore, in this example, the reinforcing flanges 3,3 are provided with extension edges 3a,3a outwardly bent and extended at the bend portion 4 from the main rod section 2 toward the first attachment section 10, whereby the bend portion 4, where stress is most liable to concentrate, can be reinforced more effectively.

On the other hand, the reinforcing flanges 3,3 have, on the side of the second attachment section 2, terminal portions 32,32 which extend in a slanting manner to terminate at the second attachment section 20 so that a transitional portion 5 continuing from the main rod section 2 to the second attachment section 20 can be strengthened. Naturally, the flanges 3,3 may be provided so as to extend up to the terminal edges of the first and the second attachment sections 10,20 thereby to reinforce also both the attachment sections 10,20.

The attachment hole 11 of the first attachment section 10 and the attachment hole 21 of the second attachment section 20 are formed, at respective peripheral edges thereof, with cylindrical projecting margins 12,22 respectively so as to receive and secure a rubber bush stably.

In the illustrated example, the bend portion 4 from the main rod section 2 toward the first attachment section 10 is depicted to assume a slight necking, but it is not always necessary to configure that portion in such a form.

The thickness of the link rod 1 can be set appropriately in conformity with the strength and mass as required, and is chosen to be, for example, 3 to 5 mm. The height of the reinforcing flanges 3,3 may also be set appropriately in conformity with the strength and mass as required, but both flanges 3,3 are not always necessitated to continue in the same height over the entire lengths thereof. The reference numeral 24 is a hole for attaching and setting a work piece material therethrough to a support member upon press forming.

Figure 6:
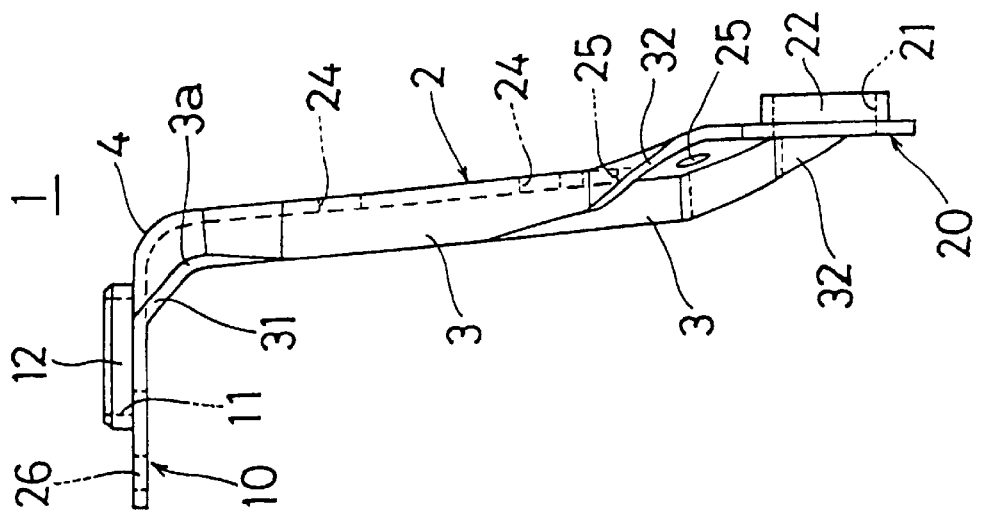
FIG. 6 is a side elevation of a second example of a link rod relating to the invention.
Figure 7:
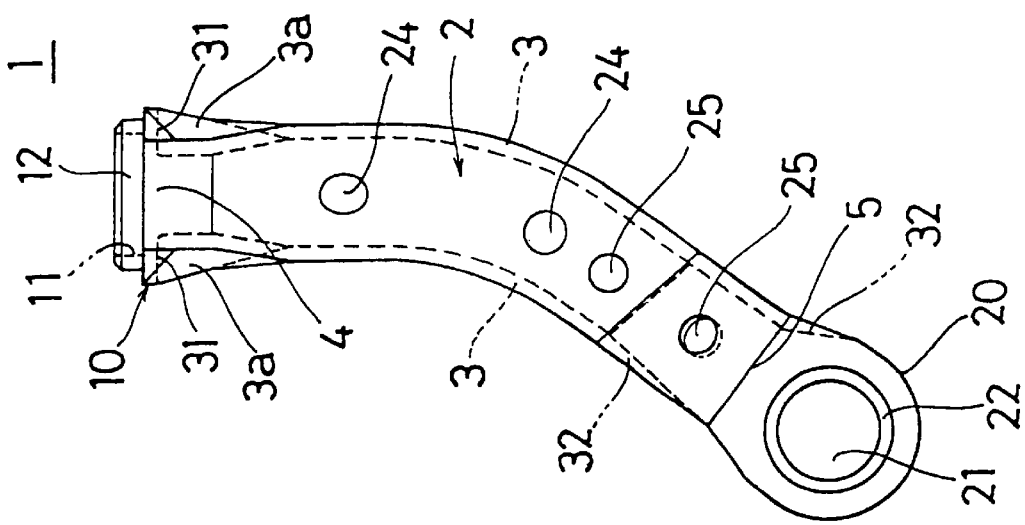
FIG. 7 is a front elevation of the link rod in FIG. 6.
Figure 8:
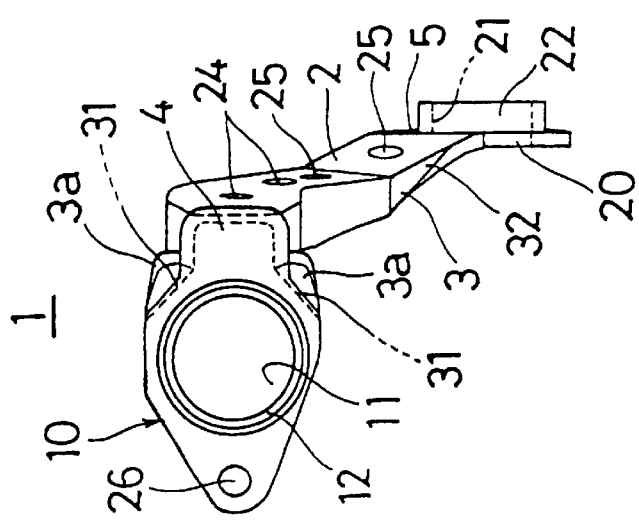
FIG. 8 is a plan view of the link rod in FIG. 6.

FIGS. 6 to 8 indicate a second example of a link rod 1 according to this invention, wherein like elements as in the first example above are designated by like numerals, and their detailed explanation is omitted.

With the link rod 1 of the second example, the fundamental constitution including the first attachment section 10 and the second attachment section 20 provided at both ends of the main rod section 2, the reinforcing flanges 3,3 formed at both widthwise side edges of the main rod section 2, the extension edges 3a,3a at the bend portion 4 and so forth is similar to that of the aforesaid first example. In this second example, the foregoing constitutions are adopted in order to bring into weight reduction of the overall rod:

In the main rod section 2, there is formed one or more through-hole 25 at such a place that is required not to adversely affect the strength or the like in use, aside from the hole 26 for setting upon press forming. The reinforcing flanges 3,3 are inclined at their extremities 32,32 on the side of the second attachment section 20, in a manner tapering in height of each flange to terminate short of the transitional portion 5 continuing from the main rod section 2 to the second attachment section 20. That is, the plate plane of the second attachment section 20 extends in nearly the same direction as the extending direction of the main rod section 2 and hence stress concentration hardly occurs on the transitional portion 5 between the main rod section 2 and the second attachment section 20. Therefore, the termination of the reinforcing flanges 3,3 short of the transitional portion 5, as stated above, avoids creating a problem in strength.

Further, the first attachment section 10 is contoured at its top end portion in a generally triangular form and is defined with a through-hole 26 at its top end. On the other hand, the second attachment section 20 is contoured in a circular form.

Figure 9:
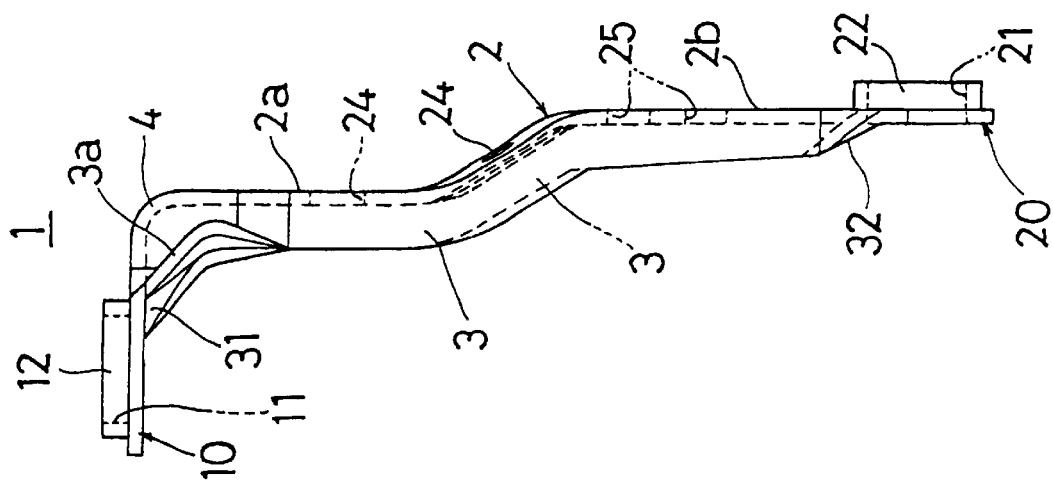
FIG. 9 is a side elevation showing a third example of a link rod pertaining to this invention.
Figure 10:
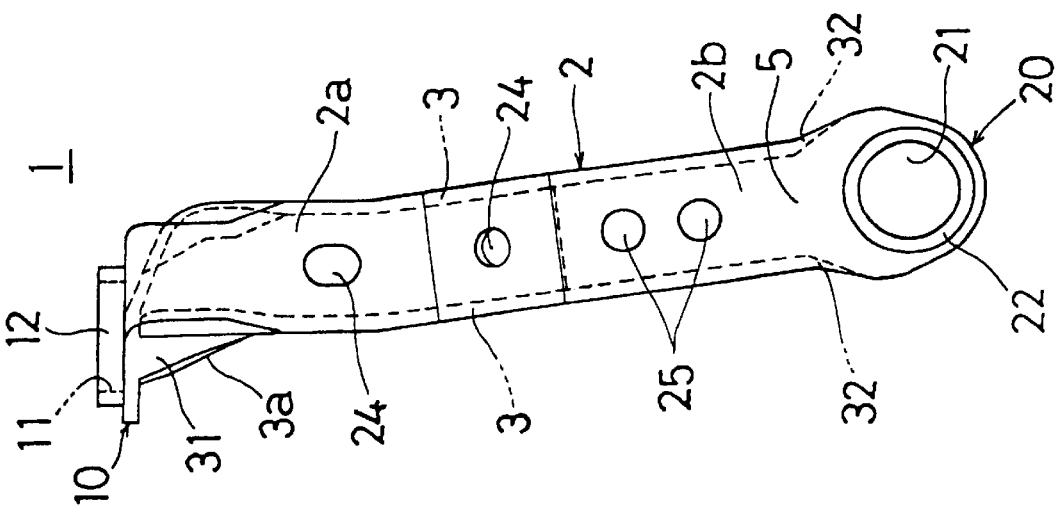
FIG. 10 is a front elevation of the link rod in FIG. 9.
Figure 11:
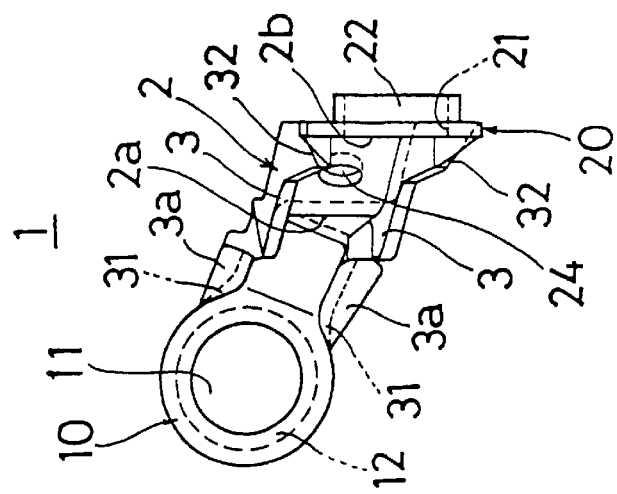
FIG. 11 is a plan view of the link rod in FIG. 9.
Figure 12:
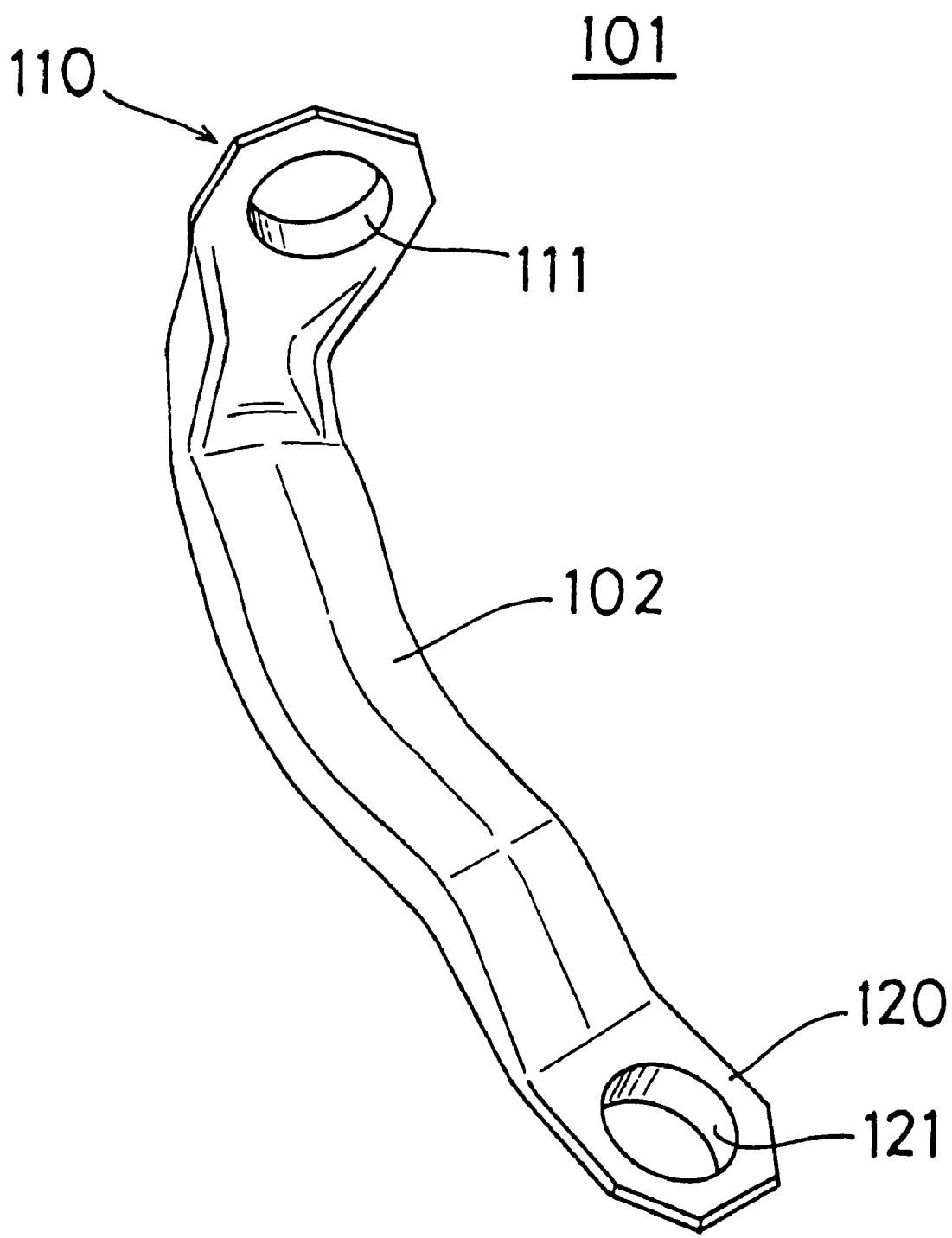
FIG. 12 is a perspective view of a prior art link rod.
Figure 13:
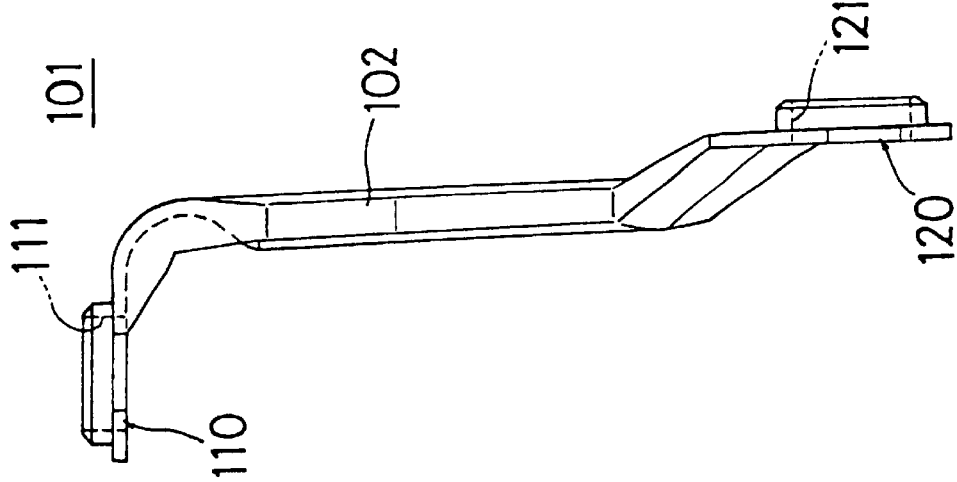
FIG. 13 is a side elevation of the link rod in FIG. 12.
Figure 14:
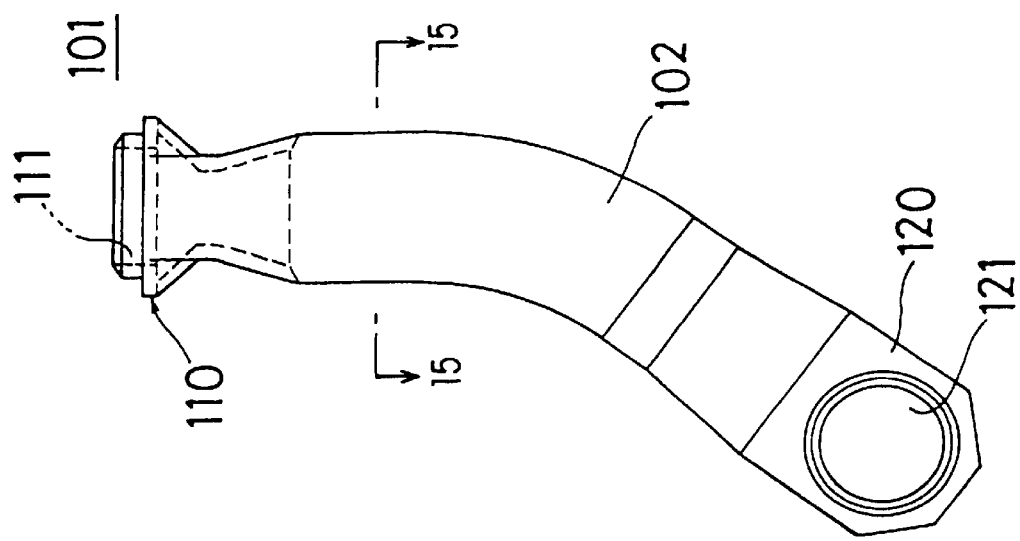
FIG. 14 is a front elevation of the link rod in FIG. 12.
Figure 15:
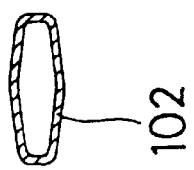
FIG. 15 is a sectional view of FIG. 14 taken along the 15—15 line.

FIGS. 9 to 11 show a third example of the link rod 1 according to this invention, wherein elements similar to those in the first example are designated by like numerals and their detailed explanation will be omitted.

The fundamental constitution of the link rod 1 in this third example is likewise similar to that of the first example with regard to the first attachment section 10 and the second attachment section 20 provided at both ends of the main rod section 2, the reinforcing flanges 3,3 formed at both widthwise side edges of the main rod section 2, the extension edges 3a,3a at the bend portion 4, etc. In the third example, owing to a different mounting state inside the vehicle from that of the first example, the main rod section 2 is formed to extend generally straight, as viewed from the front side, and is bent in the nearly middle of the extending direction, thereby producing an offset at both terminal positions 2a, 2b thereof, as viewed from the lateral side.

In addition, the main rod section 2 is defined, at a required place not affecting the strength or the like in use, with one or more through-holes 25, aside from the hole 24 for setting upon press molding, whereby weight reduction is attained.

The reinforcing flanges 3,3 at both lateral edges of the main rod section 2 are configured to conform to the bend form of the main rod section 2 and to taper in height of the flange to the side of the second attachment section 20. The first attachment section 10 is contoured in a circular shape whereas the second attachment section 20 is contoured at its top end in a semi-circular form.

In the second example and the third example, the plate thickness of the link rod 1 can be set suitably in conformity with the strength and mass as required, and the reinforcing flanges 3,3 can also be set suitably in conformity with the strength and mass as required.

The link rod 1 of this invention as constructed above is used for linking a member receiving and bearing an automobile engine, transmission and related components to the body frame to support in a suspension state. At that time, for instance, the first attachment section 10 is mounted and secured to the body frame side through a rubber bush fitted in the attachment hole 11, whereas the second attachment section 20 is mounted and secured to the member side through the rubber bush fitted in the attachment hole 21.

The rubber bush generally comprises a rubber-like elastomer interposed between an inner cylinder and an outer cylinder, wherein the outer cylinder is press-fitted and secured into the attachment holes 11, 21, whereas the inner cylinder is inserted or received therein with a bolt or other attachment shaft thereby to be fastened and secured to the body frame or the member. The aforesaid mounting operation to the member side may be performed by joint fastening with a traverse link.

In the state of use as described above, the link rod can retain a sufficient strength in spite of being made of the plate material because of the reinforcing effect due to the flanges 3,3 which the main rod section 2 has at both side edges thereof. In particular, because the flanges 3,3 extend from the main rod section 2 at least to the radius end of the bend portion 4 at the first attachment section 10, for example, extend up to the first attachment section 10 as shown, the bend portion 4 is reinforced, so that a sufficient strength and a predetermined spring rate can be secured. Moreover, since the flanges 3,3 are bent outwardly at the bend portion 4 to form the extension edges 3a,3a, the bend portion 4 prone to cause a stress concentration is further reinforced, which enables enhancement of the spring rate of the link rod 1 itself.

Moreover, having recourse to the press forming from a plate material, the fabrication work is facilitated, enabling the production at an inexpensive cost and besides, boring work and alteration of the flange 3 in height are readily performed. Consequently, it is possible to calculate the strength and mass by a design model and to predict the spring rate by a model analysis, and even the natural frequency value can be determined with ease by calculation. The control of the link rod in strength and mass, therefore, optionally permits a natural frequency value adapted to vibration isolation characteristics to be set and to facilitate reinforcing the stress concentration part.

For example, for comparison purposes between the invention products and prior art product, a model of the first example product obtained by press forming from a plate material as shown in FIGS. 1 to 5 and a model of the prior art product made of a pipe material as shown in FIGS. 12 to 15 were analyzed in terms of spring, rate and natural frequency value, and resulting data are given in Table 1 below.

Here, the model of the conventional product was flattening-worked from a pipe material of 2 mm in thickness and as a result, the first attachment section 110 and the second attachment section 120 were 4 mm thick, the main rod section 102 had dimensions of 40 mm widthwise and 15 mm in the thickness direction, the distance between the plate plane of the first attachment section 110 and the axis center of the second attachment section 120 was approximately 197 mm.

On the other hand, the invention model was worked by press forming of a plate material of 4 mm thick and its dimensions were such that the main rod section 2 was 40 mm widthwise, the flange 3 was 13 mm in height, the distance between the plate plane of the first attachment section 10 and the axis center of the second attachment section 20 was approximately 192 mm.

TABLE 1

|  | Spring Rate (N/m) | Natural Frequency Value (Hz) |
|---|---|---|
| Example Product (press-molded product) | 55500 | 868 |
| Prior Art Product (pipe product) | 28600 | 958 |

As stated above, the model of the example product has a roughly equal natural frequency value to that of the prior art product, but is significantly elevated in spring rate in comparison to it. This is believed ascribable to the fact that the flanges 3 are provided at the bend portion 4 and further formed with extension edges 3a bent outwardly, whereby the strength is significantly increased.

As for the link rod of the second example shown in FIGS. 6 to 8 or the link rod of the third example shown in FIGS. 9 to 11, the reinforcement action due to respective fundamental constitutions, more particularly, due to the flanges 3 and the extension edges 3a is likewise exhibited. Consequently it follows that a natural frequency value, almost equivalent to that of the prior art product, is likewise obtainable as is the case with the foregoing model of the first example, a higher spring rate than the prior art product is obtainable, and the product is rendered more light-weight than the prior art product because of its construction.

Being press-molded of a plate material as described above, the link rod of this invention not only can be easily fabricated and worked, and offered at an inexpensive cost, but also can retain sufficient strength owing to the reinforcing flanges in spite of being made of a plate material. Additionally, the strength, mass and spring rate of it can be readily adjusted by altering the plate thickness of the link rod and the size of the flange, and the natural frequency value can also be optionally set.

Because the fabrication is facilitated, the strength and mass are readily adjustable, and the natural frequency value can be set optionally, the link rod of this invention can be used advantageously as a link rod connecting an automobile body frame and a member suspended thereto.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A link rod, comprising:
    a one-piece body press-formed from a metal plate material, said one piece body defining:
        a main rod section longitudinally extending along an extending direction, the main rod including a plate section of elongated dimension and of a required width which lies on a plate plane, the main rod section including reinforcing flanges formed at lateral edges of said plate section, said reinforcing flanges having a height measured from the plate plane to top edges thereof;
        a first attachment section lying on a first attachment plane extending crosswise to the plate plane in a manner forming a bend portion from one end of the main rod section and having a first attachment hole formed therein with a first axis center extending through said first attachment hole perpendicular to said first attachment plane, said first attachment hole being generally centrally positioned in the first attachment section, the reinforcing flanges of said main rod section being bent to extend contiguously at least to edges of the bend portion on a side of the first attachment section, the reinforcing flanges including extension edges formed from regions of the reinforcing flanges adjacent said top edges which are bent laterally outward from a remainder of the reinforcing flanges in a direction crosswise thereto, said extension edges being disposed at the bend portion and extending at least from an end portion of the main rod section adjacent said one end of the main rod section toward the first attachment section; and
        a second attachment section extending contiguously from an opposite end of the main rod section along a second attachment plane which is co-directional with said plate plane and having second attachment hole with a second axis center extending in a direction perpendicular to said second attachment plane.

2. A link rod according to claim 1, wherein the said reinforcing flanges are formed by bending of the metal plate material on the side of the first attachment section so as to extend contiguously to, and alongside of, the first attachment section.

3. A link rod according to claim 1 or claim 2, further comprising cylindrical projections at respective peripheral edges of the first and second attachment holes of the first attachment section and the second attachment section.

4. A link rod according to claim 1, wherein the main rod section is bent at a middle position thereof relative to the plate plane, such that said second attachment plane is offset from said plate plane.

5. A link rod according to claim 1, wherein said reinforcing flanges are formed by being bent approximately squarely on a same side of said main rod section at which the first attachment section is bent, whereby the main rod section assumes a generally U-shaped cross-section.

6. A link rod according to claim 1, wherein terminal portions of the reinforcement flanges are formed contiguously to be inclined up to the first attachment section.

7. A link rod according to claim 1, wherein the reinforcing flanges extend up to terminal edges of the first and the second attachment sections to thereby reinforce both of the attachment sections.

8. A link rod according to claim 1, wherein the main rod section includes at least one through-hole formed at such a place that does not significantly adversely affect a strength of the link rod, to reduce a weight thereof.

9. A link rod according to claim 1, wherein said reinforcing flanges inclined at extremities thereof on a side of the second attachment section in a manner in which each of said reinforcing flanges tapers in height to terminate short of a transitional portion continuing from the main rod section to the second attachment section.

10. A link rod according to claim 1, wherein the first attachment section is contoured at a top end portion in a generally triangular form and includes a through-hole at said top end, and the second attachment section is contoured in a circular form.

* * * * *